United States Patent [19]

Jehle et al.

[11] 4,233,324

[45] Nov. 11, 1980

[54] ISOLATED SOY PROTEIN COMPOSITION

[75] Inventors: Felix A. Jehle, Brooklyn, N.Y.; Fawzy Ali, Roselli Park, N.J.

[73] Assignee: International Vitamin Corp., Union, N.J.

[21] Appl. No.: 910,308

[22] Filed: May 30, 1978

[51] Int. Cl.$^3$ ............................................... A23J 3/00
[52] U.S. Cl. .................................... 426/96; 426/548; 426/656
[58] Field of Search .................... 426/89, 93, 97, 548, 426/656, 103

[56]  References Cited

U.S. PATENT DOCUMENTS

| | | | |
|---|---|---|---|
| 3,282,706 | 11/1966 | Muller et al. | 426/548 |
| 3,672,914 | 6/1972 | Delaney | 426/97 |
| 3,851,070 | 11/1974 | Sessoms et al. | 426/548 |
| 3,851,073 | 11/1974 | Cook | 426/548 X |
| 3,988,511 | 10/1976 | Schapiro | 426/656 X |

OTHER PUBLICATIONS

Hawley, G. G., The Condensed Chemical Dictionary, Van Nostrand Reinhold Co., N. Y., 1971, p. 783.

*Primary Examiner*—Robert A. Yoncoskie
*Attorney, Agent, or Firm*—Posnack, Roberts, Cohen & Spiecens

[57]  ABSTRACT

An edible isolated soy protein composition characterized by free flowing characteristics, easy dispersibility in liquids and absence of objectionable taste. The composition is prepared by coating particles of the soy protein with particles of silicon dioxide and mixing the coated particles with ammoniated glycyrrhiza.

2 Claims, 2 Drawing Figures

ISOLATED SOY PROTEIN COMPOSITION

This invention relates to isolated soy protein.

BACKGROUND OF THE INVENTION

Isolated soy protein, which contains approximately 95% protein, is highly regarded for its nutritional value. However, its use has been severely limited because of inherent undesireable characteristics. These characteristics include:

1. Inability to flow freely.
2. Inability to disburse in liquids without special equipment or violent and prolonged agitation.
3. Characteristic objectionable taste which can be masked only with extremely strong flavoring agents or by severe dilution of the protein content. Simple addition to milk or fruit juices has been found to be inadequate to mask undesireable flavor components.

BRIEF SUMMARY OF THE INVENTION

The invention is characterized by coating particles of isolated soy protein with silicon dioxide particles to render the particles free flowing and readily dispersible in liquid. An amount of ammoniated glycyrrhiza is added which is sufficient to sweeten the composition, but which is less than that which will impart the characteristic taste of licorice.

DESCRIPTION OF THE PREFERRED EMBODIMENT:

Ammoniated glycyrrhizin is a sweetener which is on the FDA list of natural flavoring agents generally recognized as safe. It has a characteristic licorice flavor. It has been found that by mixing isolated soy protein with between 0.1 and 2.0 percent by weight of the protein of the ammoniated glycyrrhizin, the objectionable taste of the isolated soy protein is overcome and yet the licorice taste is masked. This permits the use of the composition in foods.

Figure 2:
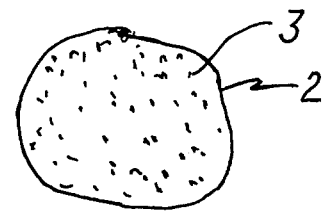
FIG. 2 is a greatly enlarged perspective view of a typical isolated soy protein particle coated with particles of silicon dioxide.

In order to render the composition readily dispersible in liquids, particles of the isolated soy protein are coated with particles of silicon dioxide. This is shown in FIG. 2 where the protein particle 2 is coated with the particles of silicon dioxide 3.

Figure 1:
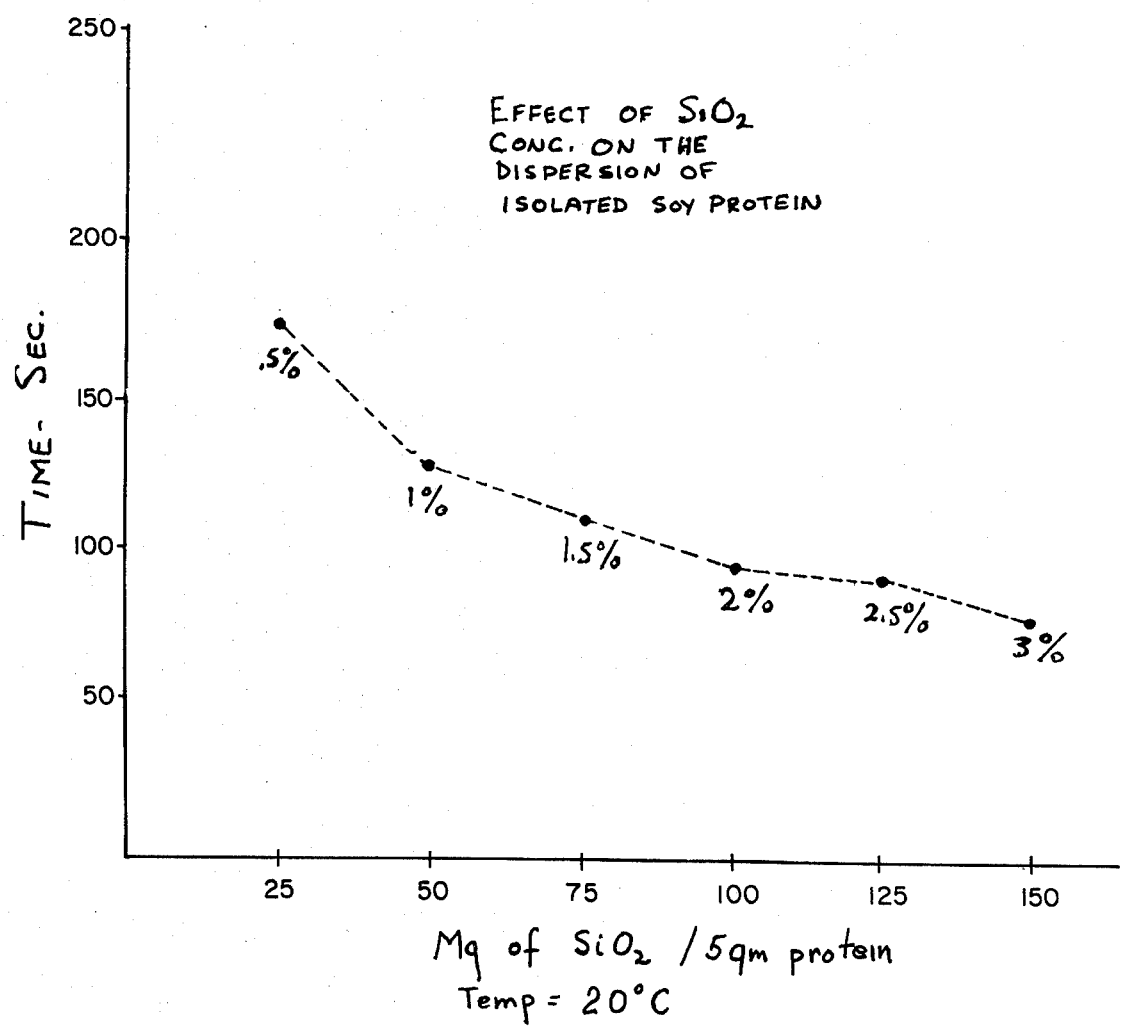
FIG. 1 is a plot of time vs. the quantity of silicon dioxide for a given quantity of protein showing the effect of silicon dioxide concentration on the dispersion of the isolated soy protein.

A series of compositions were compounded utilizing five gram samples of the isolated soy protein and mixing the batches with various amounts of silicon dioxide (CABOSIL BRAND) in proportions varying from 0.5% to 3% by weight. The mixing was carried out in a Fitzpatrick Comminuter (a high-speed mill). Other conventional mills and rotating mixers could be used for this purpose. The time required for dispersing the resultant coated particles in a given amount of liquid is shown in the graph of FIG. 1. The composition was found to be anti-caking and free flowing.

In addition to the effect on dispersion, the silicon dioxide treatment improved the flow characteristics of the soy protein.

When 20 grams of the original soy powder is poured into a funnel with a ¼" opening, the aperture quickly blocks and the powder ceases to flow. After the silicon dioxide treatment, a like quantity of the soy powder poured into the same funnel passes completely through the opening in less than 15 seconds.

To batches of thus coated powder, between 0.1% and 3% of ammoniated glycyrrhizin was added by mixing. It was found that at 0.1% the objectionable soy taste was sufficiently masked to permit use of the isolated soy protein in flavored drinks such as chocolate drinks. At the higher amount of 3%, a slight licorice taste was noticeable. A preferred concentration was found to be about 0.3%.

In summary, there has been provided an isolated soy protein composition characterized by free flow, easy dispersibility and freedom from undesireable taste.

What is claimed is:

1. A composition consisting essentially of isolated soy protein particles and a coating thereon of from 0.5 to 3.0 percent by weight of silicon dioxide, and from 0.1 to 3.0 percent by weight of ammoniated glycyrrhiza, said ammoniated glycyrrihiza being effective to conceal the taste of said soy protein particles but being present in insufficient amount to cause a licorice taste.

2. The composition of claim 1 containing approximately 0.3% of ammoniated glycyrrhiza.

* * * * *